April 14, 1953    C. J. T. YOUNG    2,635,193
NONLINEAR OPTICAL AMPLIFIER
Filed July 12, 1947
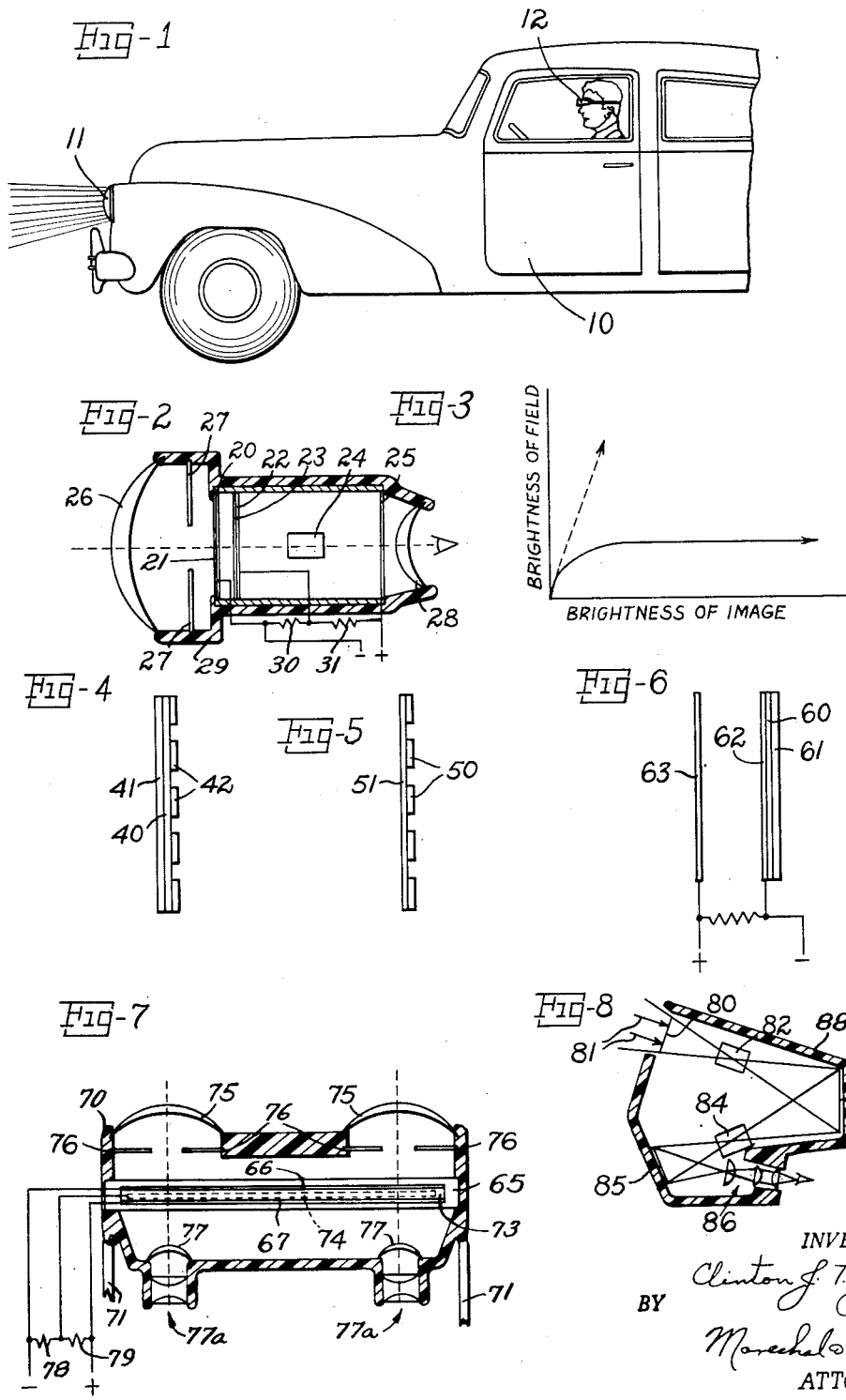
INVENTOR.
Clinton J. T. Young
BY
Marechal & Biebel
ATTORNEYS

Patented Apr. 14, 1953

2,635,193

UNITED STATES PATENT OFFICE 2,635,193

NONLINEAR OPTICAL AMPLIFIER

Clinton J. T. Young, Oak Ridge, Tenn.

Application July 12, 1947, Serial No. 760,575

21 Claims. (Cl. 250—213)

This invention relates to optical devices having particular application as viewing devices for obviating headlight glare in driving motor vehicles at night and under similar conditions of difficult vision.

It has long been recognized that the glare resulting from the headlamps of approaching vehicles constitutes a major hazard when driving at night and severely complicates the provision of adequate illuminations for proper visibility. A driver obtains visibility in the absence of an approaching vehicle primarily by reflection of the light of his own headlamps by the various objects present in his field of view. But the reflective powers of most objects are relatively poor and therefore there is present only a comparatively low level of brightness. This is usually sufficient for fairly good vision in the absence of an approaching vehicle or other sources of direct light of a high level of brightness, but when such light of high brightness is present, it is no longer feasible for the eyes to make adequate adjustment to maintain proper visibility for the portions of the field of both high and low brightness necessary to be viewed.

In general, visibility will be improved by any reduction in the apparent brightness of approaching headlamps or other source of direct or glare light without a comparable reduction in the apparent brightness of the remainder of the field. At the same time, it will be noted that the desired results cannot be obtained by general reduction in overall brightness by means of such filtering media as sunglasses. In fact, the use of such media is likely to be unsafe, since the headlamps are on the average so much brighter than the rest of the field that to reduce their apparent brightness materially it is necessary to use a filter of such low transmission properties that the remainder of the field will be too dark for adequate perception.

It has been proposed to accomplish the desired result by providing automobiles with light-polarizing headlamps and providing the drivers of these cars with light polarizing visors or eyeglasses. Such a system results in reducing the apparent brightness of the field by a relatively small factor in comparison with the much larger reduction in the apparent brightness of the headlamps of approaching cars. However, this system requires complementary equipment on all vehicles on the road for full effectiveness, and the light polarizing visor provides no benefit for the wearer against a car not equipped with light-polarizing headlamps.

One of the principal objects of the present invention is to provide a viewing device for use when driving at night or under similar conditions of low general illumination but high optical contrast which will be effective to amplify the apparent brightness of the user's field of view sufficiently for clear general visibility while at the same time preventing the apparent brightness of the sources of direct or glare light from reaching a level sufficiently high to interfere with inadequate visiblity of the field as a whole.

Another object is to provide such a viewing device which will operate effectively for reducing the glare of bright light sources such as approaching headlamps at night while affording adequate visibility of the remainder of the field of view without the necessity of special complementary or supplementary equipment in or on the other vehicles and notwithstanding the apparent brightness of such direct light sources.

An additional object is to provide a viewing device capable of receiving light rays from a field of view and forming an optical image of the field having amplified general apparent brightness in comparison with the field but which will have the characteristic of becoming selectively saturated in accordance with the distribution of brightness in the field and of correspondingly reducing the optical contrast of the image with relation to the field.

Still another object is to provide an optical system for producing an image of a field of view which is effective to amplify the apparent brightness of the image with respect to that of the field and which is also effective to produce predetermined alteration in the optical contrast of the image with respect to that of the field and thus to make predetermined areas of the image relatively more visible than they are in the field under existing conditions of illumination.

It is also an object of the invention to provide such a viewing device which will not interfere with the normal binocular vision and depth perception of the user and which will accordingly enable the user to see clearly and without eyestrain while protecting him against glare from direct or other bright light sources in the field or image.

A further object is to provide such a device which is of relatively light weight and simple construction and which can be readily incorporated in a self-contained unit adapted for wear by an automobile driver or other individual without discomfort.

A still further object is to provide such a viewing device which does not require sources of artificial illumination and which affords adequate visibility for the user even under conditions such as the substantially total absence of visible light, heavy fog, or the like.

Other objects and advantages of the invention will be apparent from the following description, the accompanying drawing and the appended claims.

In the drawings—

Fig. 1 is a view in side elevation of an automobile showing the driver equipped with a binocular viewing device constructed in accordance with the present invention;

Fig. 2 is a diagrammatic view of one form of optical system in accordance with the invention which may be incorporated in each barrel of the attachment worn by the automobile driver in Fig. 1;

Fig. 3 is a graph illustrating diagrammatically the operation of the optical system of Fig. 2;

Fig. 4 is a diagrammatic view illustrating a modified construction of optical amplifier for use in the device of the invention;

Fig. 5 is a diagrammatic view illustrating another modified form of optical amplifier for use in the device of the invention;

Fig. 6 is a diagrammatic view illustrating another modified arrangement for limting amplification in the device of the invention;

Fig. 7 is a diagrammatic view of another form of optical amplifier and optical system in accordance with the invention; and Fig. 8 is a diagrammatic view illustrating another modified form of optical system for use in the device of the invention.

The invention has particular application to the provision of adequate illumination and visibility under conditions of low general illumination but high optical contrast, such as are typically exemplified by the conditions commonly encountered when driving an automobile at night. The strong light sources in a driver's field of view, and particularly the headlamps of approaching cars, are so much brighter than the remainder of the field that they seriously obscure general vision both while they are approaching and even for an interval after they have passed, as is well known. The present invention overcomes these conditions of glare by providing a viewing device comparable to a goggle which may be worn by a driver at night and which is of such optical characteristics and properties as to reproduce for the user a three-dimensional optical image corresponding accurately to the field as viewed directly but of changed optical contrast, with the sources of direct or glare light substantially reduced in apparent brightness and with the apparent brightness of the remaining areas substantially amplified.

The invention provides an optical device which is effective to receive light rays from a field of view and to emit amplified rays so corresponding in position and direction to the incident rays as to form an image corresponding to the field, but the device is so constructed as to become selectively saturated in accordance with the distribution of brightness in the field and thus to limit the maximum apparent brightness of the image. The device of the invention thus provides an image of the field wherein the bright areas are held to a maximum brightness level which will not interfere with adequate perception of the less bright areas, and wherein in turn the apparent brightness of the less bright areas is amplified with respect to the brightness of the corresponding areas in the field and these areas are accordingly made more readily visibile. Thus the invention provides for forming an optical image of reduced optical contrast but amplified general brightness such that each area is clearly visible while at the same time no area is so bright as to interfere with adequate perception of any other area or areas.

The invention is applicable generally to optical systems which include means for receiving light from a field of view, a screen or other means for reproducing a visual image of the field in response to light incident on the receiving means, and an optical amplifier effective to amplify the brightness of the image with respect to the brightness of the field. If the amplifier is sufficiently powerful, such a system will provide adequate visibility under substantially any conditions of low general illumination and low optical contrast. However, if there are sources of direct or other bright light in the field, their apparent brightness will be amplified in the image to the same degree as that of the less bright areas, with the result that the image produced by the device will usually not afford a useful improvement in visibility over direct viewing of the field. Some areas of the field having brightness below threshold for the eye may be made visible in the image and thus relatively more visible than before, but this is not likely to be a sufficient improvement, particularly in view of the fact that the tendencies towards glare from the light sources in the field will be correspondingly amplified in the image.

The present invention accordingly provides for selectively controlling amplification in an optical system of the above type in order to provide for predetermined alteration of the optical contrast in the image with respect to that in the field, with the optical contrast, i. e., the ratio of brightness of the relatively more and less bright areas, being either decreased or increased in the image depending upon the desired conditions and results. For example, the invention provides for so controlling amplification as to prevent the brightness of any area in the image from exceeding a predetermined maximum level while still giving adequate amplification of the areas in the image corresponding to the less bright areas of the field. This result may be produced in accordance with the invention by producing selective saturation of the device in accordance with the distribution of brightness in the field and thus limiting the maximum apparent brightness of any area in the image. In this way, the optical contrast of the image is changed with respect to that of the field, and in particular the contrast of the image is limited, preferably relatively sharply, when a predetermined level of brightness or contrast is reached in the final image or in the initial scene or field of view. When such a level is reached at a given area of the image, further increase in brightness in the corresponding area of the field will not result in proportional further amplification in the image, but the other areas whose apparent brightness is still below the maximum level will continue to be amplified in brightness to the full extent provided for by the amplification factor of the device.

This principle of operation of the viewing devices of the invention is illustrated by the graph in Fig. 3 of the drawing. In this graph the abscissae represent the brightness, in any suitable units such as foot lamberts, of the light from a given area of the field of view incident on the receiving means of the device, and the ordinates represent the apparent brightness in the same units of the corresponding area of the image produced by the device. It will be noted that the amplification curve is initially substantially linear, as shown by the solid line arrow, and in the absence of provision for saturation, the curve could be expected to continue proportionately linear as indicated by the dotted line arrow. However, the invention provides for preventing this linear function and for progressively limiting amplification up to a predetermined saturation value at which the amplification curve levels off rapidly and thereafter remains substantially invariant with the input as shown in Fig. 3. This saturation may occur at a fixed brightness level in either the field or the image, with the amplification being adjusted to bring the maximum brightness of the image other than direct light sources therein to a level relatively closely below the maximum, or it may occur at a sliding level related to the average brightness of the scene or field of view as a whole, and it will accordingly be understood that the curve in Fig. 3 is merely illustrative of conditions attainable by means of the present invention.

In the use of the invention for night driving or under similar visibility and illumination conditions, it provides for selectively controlled amplification of the light from a field of view to give an optical image of amplified general brightness but reduced contrast and limited maximum brightness, with the reduction in contrast being more or less in inverse ratio to the contrast of the field as viewed directly. Thus for example, if the contrast in the field is low, as would be likely at night in the absence of artificial light sources, the image produced by means of the invention would possess substantially the same contrast as the field but a generally higher level of brightness. On the other hand, the field of view of an automobile driver when another car is approaching is one of extremely high contrast, with the headlamps of the other car being relatively very much brighter than the remainder of the field. The invention provides a device capable of use under such conditions to produce an image of correspondingly reduced contrast. Thus the device will produce an image wherein the areas surrounding the headlamps are of amplified brightness but with the headlamps themselves of reduced apparent brightness not only in comparison with the surrounding areas of the image but also in comparison with their brightness as viewed directly in the field, or the headlamps themselves may preserve their actual brightness in the image or even be increased in apparent brightness provided the rest of the field is amplified to a sufficiently greater extent to decrease the image contrast sufficiently for adequate perception and visibility.

Referring to the drawing, which illustrates preferred embodiments of the present invention, Fig. 1 shows an automobile 10 provided with headlights 11 and with the driver wearing a binocular viewing device 12. In accordance with the invention, the viewing device 12 includes a pair of optical systems, one for each eye of the wearer, for receiving light from the wearer's field of view and reproducing an image of the field of changed optical contrast such that those areas of the field which constitute sources of direct or glare light are reduced in apparent brightness in the image and are thus prevented from interfering with adequate visibility of the surrounding or other areas or parts of the image. In addition, these two systems are so arranged in the viewing device that their respective means for receiving light from the field are spaced at substantially the average interocular distance to provide a three-dimensional image having the proper accurate relation to the field as viewed directly.

Fig. 2 illustrates an optical system in accordance with the invention which will provide these desired results when incorporated in a viewing device such as the binocular device 12 in Fig. 1. This system includes a layer 20 of photoelectric material on a supporting layer 21, a layer 22 of secondary electron emissive material on a supporting layer 23 in the path of primary electrons from layer 20, and an electron lens 24 adapted to focus the electrons from layers 20 and 22 on a suitable viewing screen 25 such as a phosphor screen. An electric field is provided as indicated to draw the electrons through the system, the spaces between the electron emissive layers and the screen being evacuated sufficiently to allow the electrons to complete their trajectories substantially without interference from gas molecules. A wide-angle lens 26 may be positioned as shown in Fig. 2 between photoelectric receiving layer 20 and the field of view, and it may be provided with a suitable stop 27 to control stray light and reduce aberration. The image on screen 25 may be viewed through a suitable eye piece 28 as shown, and a suitable envelope or housing is indicated at 29. It should also be noted that for some purposes of the invention, the layer 20 should be sensitive to invisible light rays such as infrared or ultraviolet as well as to light rays in the visible portion of the spectrum. Such invisible light rays may be present in substantial quantity when visible light is at a minimum; since infrared rays have substantial penetrating power under conditions of fog and the like, and they may be of great assistance in activating the device.

In operation with the system shown in Fig. 2, each primary electron dislodged from the layer 20 may in turn dislodge a plurality of secondary electrons from the layer 22. In addition, if the supporting layer 23 be sufficiently thin, for example a thin pellicle of transparent plastic or a thin cleavage plate of mica, most of the primary electrons will be able to penetrate it and thus be able to reach the emissive layer 22. The parts are preferably arranged as shown in Fig. 2, with the layer 22 on the surface of supporting layer 23 facing the screen 25, because the secondary electrons will be emitted with relatively low velocity and will be less able to penetrate the support 23 than the primary electrons. The electric potential of the source of secondary electrons may be between those of the primary source and the screen, as by means of voltage-dividing resistors 30 and 31 as shown. It should be also noted that optimum image clarity is obtained if the secondary source is near an electron image surface, i. e., near either the primary source or the screen, particularly in systems of the type shown in Fig. 2 and including an electron lens.

The desired saturable amplification may be obtained with the system illustrated in Fig. 2 by forming one or both of the layers 20 and 22 from which electrons are to be emitted of such thickness as to limit the number of electrons available. Particularly effective results will be obtained by forming such layer or layers of a material having appreciable electric resistance, for example a thin film of a metal such as caesium or other material suitable as a source of photoelectrons. With this arrangement, if a large number of electrons are dislodged from a relatively small area of the layer, as will be the case for an area corresponding to a very bright part of the field of view, electrons will not immediately replace those which have been emitted, and net positive charges will appear, varying in strength in accordance with the relative brightness of the corresponding area in the field. These charges will act on the subsequently emitted electrons so that the slower such electrons will be drawn back into the emissive surface. Furthermore, these charges will accumulate most rapidly in the areas corresponding to the brightest areas in the field, thus providing for a correspondingly rapid increase in the limitation of effective emission from such areas until a saturation level is reached at the maximum brightness for which the device is designed.

The graph in Fig. 3 illustrates an amplification curve and saturation effect which may be obtained by means of this system and arrangement. When the light from the field incident on layer 20 is of low intensity, as will occur in the areas of the receiving layer corresponding to dimly lighted areas of the field, there will be a correspondingly low emission of electrons from layer 20, and hence also from layer 22. Since this in turn will produce only weak positive charges at these areas of the emissive layers, there will be a correspondingly slight limitation on electron emission, and the amplification will approach the maximum afforded by the system, as indicated by the straight portion of the curve in Fig. 3 nearest the zero position. On the other hand, in the areas of layer 20 where the incident light is brighter, the positive charges will accumulate more rapidly and hence will increase the limitation on electron emission, and the amplification curve will fall off at a correspondingly rapid rate until it reaches the saturation point represented by the horizontal portion at the right of the solid line curve in Fig. 3.

The particular value at which substantially absolute saturation is reached depends on the geometry of the system as a whole, the accelerating voltage applied to the electrons, and to a lesser extent on the nature of the electron emissive layers and the wavelengths of light and velocity of electrons involved, and it can therefore be readily controlled to suit desired viewing conditions.

In the above example, there is some tendency for electrons to flow within the emissive layers into areas from which substantial emission takes place, to replace the emitted electrons, and if such an area is particularly bright, this flow of electrons from the surrounding parts of the layer may be so great as to create a shortage of electrons for emission from the surrounding areas, which could be objectionable if there were any considerable illumination in the corresponding parts of the field. This result and effect may be controlled by forming one or more of the electron emissive layers of a multiplicity of discontinuous areas, and Fig. 4 illustrates a composite structure including such a discontinuous layer which may be substituted for either of the pairs of emissive and supporting layers 20—21 or 22—23 in Fig. 2.

In the 3-ply structure shown in Fig. 4, the middle layer 40 is composed of material offering substantial electric resistance, for example a poorly conducting metal or metallic sulfide or a thin layer of a suitable plastic, which if necessary may contain a small amount of electrolyte to prevent its resistance from being excessive. On the side of the resistance layer 40 adjacent the field to be viewed is a layer 41 of relatively good electric conductivity, for example a thin film of a highly conducting metal or metallic substance or a film of glycerine or a hydrophilic plastic containing a small amount of water and an electrolyte and provided with a cover glass to prevent evaporation of liquid therefrom. On the side of the resistance layer 40 adjacent the screen is a layer 42 of electron emissive material which may be thin and continuous, but sharpest limitation of saturation as between adjacent areas having a marked difference in illumination is obtained if the layer is composed of a multiplicity of discontinuous areas, as shown in Fig. 4. This composite layer may be substituted either for the layer 20—21 in the system of Fig. 2, in which case layers 40 and 41 should be transparent to light of the wavelengths to which layer 42 is photosensitive, or for the layer 22—23 in Fig. 2, in which case layers 40 and 41 should be transparent to electrons moving at fairly high speeds but need not be transparent to light. Also this composite layer may be positioned with the layer 42 facing the source of light or electrons by which it is actuated provided layers 40 and 41 are sufficiently thin to permit the passage of some of the secondary electrons emitted from layer 42.

In operation the composite layer illustrated in Fig. 4 provides a selectively emissive source of electrons, which may be primary or secondary depending upon its relative position in the system. In either case, each discontinuous area of the emissive layer 42 is supplied with electrons only through the part of the resistance layer 40 substantially directly in line therewith. The resulting emission from areas having strong positive charges tends to be drawn back, thus limiting effective emission from such areas, which correspond to the bright areas of the field. The discontinuities in layer 42 are preferably sufficiently fine as to avoid gaps in the final image, satisfactory dimensions being comparable to those of an optical grating, but it is to be noted that large areas with fine separation between them will not produce the same lack of definition as in a television image of large elements, since the loss will be only in the sharpness with which saturation is confined and maintained within the brightly illuminated regions. Such a discontinuous layer suitable for use for the purposes of the invention may be produced by ruling in two dimensions on a continuous layer with a ruling engine such as is used to produce optical gratings, or it may be produced by evaporating or sputtering through a screen.

In operation with the device as shown in Fig. 4, since the supply of light or electrons is from the conducting layer 41 to the electron emissive layer 42 through the portion of the resistance layer 40 directly therebetween, a portion of the electron emissive layer corresponding to a bright area in the field will acquire a relatively positive potential as a result of the potential drop in the resistance layer, but this will not have a substantial effect on the potential of the adjacent parts of the electron emissive layer, such effect being least if the thickness of the resistance layer 40 is small in comparison with the width and separation between individual areas of the electron emissive layer 42. In this way, emission from each area of the electron emissive layer can be limited to a predetermined maximum, with resulting control over the maximum brightness in each corresponding area of the image on the screen, but at the same time the local charges can leak away through the layer 40 to provide for changing conditions of brightness in the field.

Another way in which to control and reduce the optical contrast of the image with respect to that of the field is to provide near an electron emissive layer a layer of material of such electrical characteristics as to stop some of the emitted electrons and thereby to acquire a locally distributed charge capable of repelling or opposing additional electrons from the portions of the emissive layer corresponding to the brightest parts of the field. For example, the layer 22 in Fig. 2 may represent such a selective opposition layer positioned, as shown, in front of the layer 20 of electron emissive material. The opposition layer in this arrangement may be provided with a discontinuous structure such as that shown at 50 in Fig. 5, composed of areas which are of low transparency to electrons of the velocities in question interspersed with areas which are open or otherwise of substantially higher transparency to such electrons, the layer 50 being mounted on a suitable supporting layer 51. For example, such a discontinuous layer may be made by a photographic process in which, in a thin emulsion, a dense silver image of the desired low transparency areas is produced, with the unreduced silver then being removed from the higher transparency areas by fixing. It will be understood that the areas 50 of low transparency should be electrically connected to permit necessary leakage of accumulated local charges, which may be done by leaving connecting areas of higher transparency which include sufficient silver or other conducting material. For example, if this layer is made photographically as stated, sufficient dissolved electrolyte may be permitted to remain in the layer for adequate conductivity. The selective opposition layer of Fig. 5 may also be constructed in more elaborate form comparable to that shown in Fig. 4, in which case the continuous or discontinuous silver layer will correspond to the layer 42, the layers 40 and 41 being of the same characteristics as described hereinabove in connection with Fig. 4.

In practicing the invention with such opposition layers, it will be seen that light from a strongly illuminated area in the field will cause the emission of many electrons from the receiving photoelectric layer. Some of these electrons will pass through the opposition layer, but others will be stopped thereby and will produce a corresponding negatively charged area. This charge will in turn tend to repel or oppose subsequent electrons emitted from the receiving layer, thus reducing further transmission to the screen and so reducing the relative brightness of the corresponding area on the screen, and since this effect will be strongest where the number of incident electrons is high, it will result in reducing effective emission from the emissive layer in the areas where it is most concentrated. A similar arrangement may be provided in conjunction with each of one or more secondary emissive layers and will operate in a similar manner to produce saturated amplification.

A converse result may be obtained with a similar arrangement of the above intercepting layer which is also a source of secondary electrons. In such case, if the primary electrons are fast enough, each will cause the emission of several secondary electrons, adequate acceleration being dependent upon the electrical potential chosen. If thus the secondary electrons emitted exceed the primary electrons stopped by the layer, the result will be a net positive charge opposite the corresponding area of the primary source layer, which will reduce space charge and increase the effective emission, and will have the ultimate result of making the corresponding area in the image relatively still brighter than in the field.

Saturable amplification may be obtained in accordance with the invention by providing means for producing selective local charges on or adjacent the screen and thereby reducing the number of electrons striking the negatively charged areas or reducing their velocity. In this case, however, some of the electrons may be deviated instead of being entirely repelled and may strike another part of the screen and thus produce blurring of the image. This effect may be reduced by providing closely adjacent the screen a source of secondary electrons and a short distance in front of it a layer or grid to receive them, with such layer or grid being adapted to the accumulation of local charges as described above in connection with Fig. 2. Such an arrangement is shown in Fig. 6, wherein the screen 60 is mounted on a support 61 and has adjacent its surface toward the field of view a layer 62 of material providing a source of secondary electrons and wherein a grid 63 is shown as positioned closely adjacent but spaced from the layer 62. This grid layer 63 may have a potential in the quiescent state somewhat above that of the screen and layer 62, and it may be adapted, as described above, to accumulate local charges corresponding to the image and thereby to repel electrons corresponding to the brightest portions of the field. This combination of layers may be substituted for the screen 25 in Fig. 2, and if the layer 63 is somewhat more positive than the screen and is spaced a short distance in front of the screen, both the number of deviated electrons striking the screen and also their velocity will be substantially reduced.

Control of the optical contrast of the image may be obtained also by suitable control of the thickness or responsiveness of the screen itself. For example, in the case of a phosphor screen, the coating of phosphor may be so thin that its maximum brightness will be produced with less than the maximum available number and velocity of incident electrons. Also, the thickness or concentration of the screen, as well as the thickness or other properties of one or more of the electron emissive or resistance layers, may vary over the viewing area to provide for control of the optical contrast in different areas of the image. For example, there may be a graded increase in overall sensitivity in the center of the viewing area so that each part of the field will become gradually brighter in the image as it moves toward the center of the viewing area in the screen. In addition, it will be noted that the principles of the invention are equally adapted to the production of a device as described wherein amplification factors of unity or less than unity are provided, as may be desired for some purposes.

The various surfaces and layers used in the optical systems described may be flat, or one or more may be curved if desirable to simplify problems of design of the associated optical equipment. In the case of the application of the invention to a viewing device specifically intended for night driving, it is desirable that the construction provide a wide field of view, a magnification factor of unity, natural interocular distance for normal depth perception, and effective viewing points as near to the driver's eyes as possible in order to make the apparent spatial relationships in the image correspond with the real such relationships by which the driver is accustomed to operate in daylight. All these objectives may be readily obtained by suitable control of the lenses indicated schematically in Fig. 2 in accordance with standard optical principles and by embodying the system in a binocular mounting as shown in Fig. 1, and Fig. 7 shows another optical system in accordance with the invention which is particularly adapted for binocular use.

In Fig. 7 the optical amplifier 65 is an enclosed receptacle of glass or other suitable material having a layer 66 of photoelectric material on its inner surface adjacent the field of view and a fluorescent screen 67 on its opposite inner surface, and it will be seen that the device is of such dimensions as to extend across both eyes of the user for binocular vision of screen 67. A housing 70 for the device is accordingly shown as provided with suitable temples 71 for mounting in operative position as indicated in Fig. 1. The space 73 within the device is evacuated, and one or more layers 74 of secondary electron emissive material may also be provided between the layer 66 and screen 67 to increase amplification. The objective lenses 75, stops 76 and lenses 77 correspond to the similar members in Fig. 2, and eyepieces 77a are provided for viewing the images formed by erecting lens 77. It will be noted that lenses 75 are positioned at substantially the correct interocular distance apart to give the device substantially the same binocular angle as if the user viewed the field directly.

In the use of this device, an electric field is provided within the space 73, as indicated by the lead wires in Fig. 7, effective to draw electrons from the layers 66 and 74 directly across the space 73 to the screen 67 in relatively narrow parabolas, depending upon their respective angles of emission from the emissive layers, voltage-dividing resistors 78 and 79 being provided as shown for holding layer 74 at a suitable potential between those of layer 66 and screen 67. As a result, the electrons emitted from any point on the emissive layers will fall within a relatively small region on the screen and will thus produce an image of amplified brightness and sufficient sharpness for adequate viewing. Control and saturation of amplification may be obtained with this system by constructing one or more of the emissive layers 66 and 74 as described in connection with Figs. 2 to 5, or by equipping the screen 67 as described in connection with Fig. 6. It will also be understood that the operation will be substantially the same if a pair of amplifiers 65 is used, with each providing an image for one eye of the user.

It is also possible in accordance with the invention to utilize an optical system which is folded back on itself in an arrangement roughly comparable to that of a prism binocular. Fig. 8 illustrates such an arrangement wherein the surface 80 represents a source of electron emission, which may be a source of primary emission arranged for actuation by incident light from the field as indicated by the arrows 81 or a source of secondary emission arranged for actuation by electrons from a suitable primary source, in which case the surface 80 will correspond to the emissive layer 22 in Fig. 2. The electrons emitted by the surface 80 are focused by the electron lens 82 on a further electron emissive surface 83, which is shown as arranged to emit electrons from its surface facing the lens 82. These secondary electrons are in turn focused by an electron lens 84 on a viewing screen 85, and the resulting image may be viewed as indicated by means of a suitable erecting eyepiece 86, a suitable envelope or housing for this system being indicated at 88. It will be readily apparent that this arrangement of multiple electron emissive layers may be carried to further lengths to build up the number of electron sources and thus the maximum amplification. Any one or more of these electron sources may be constructed as described in connection with Figs. 2 to 5 to provide the desired saturable control over maximum brightness.

It will accordingly be seen that the invention provides an optical system which may be utilized in a viewing device under substantially all conditions of illumination to give adequate visibility without the danger of glare or blinding as a result of overly bright light sources in the field. With the device of the invention, the light from the field of view will be amplified to give an image wherein all parts of the field will be clearly visible and in approximately normal relative optical contrast with the exception of bright light sources, which will be reduced in relative intensity to an extent sufficient to prevent interference with vision of the remainder of the image. It may be used not only at night, when normal illumination is inadequate for unaided vision, but also when there is ample light but a glare source, for example when driving toward the setting sun or particularly when the sunlight is reflected toward the driver from a flat surface. If the photoelectric material in the receiving means of the device is chosen so as to be sensitive to infrared light, the device of the invention will be found highly useful for driving in fog, particularly in an automobile having head lights of sufficient wattage to provide an adequate source of infrared radiation and with filters either over the headlights or over the device of the invention to cut out the visible light scattered by the mist, and accordingly the terms "light" and "light rays" are used herein to include both visible light and also similar radiant energy such as ultraviolet and infrared radiation of wavelengths close to the visible range.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:
1. An optical device for producing nonlinear optical amplification comprising, in combination, means for receiving light rays from a field of view, means actuated by said receiving means to produce a visual image of said field in response to light rays incident from said field on said receiving means, means cooperating with said receiving and image-producing means for amplifying the brightness of said image with relation to that of said field and for causing predeter- mined alteration of the ratio of brightness of the relatively more and less bright areas in said image with respect to the ratio of brightness of the corresponding areas in said field, and said device including a layer of material adapted in response to radiation incident thereon to emit electrons at a ratio of emitted to incident radiation for each unit area thereof varying with the rate of emission of electrons therefrom to effect said alteration of the brightness of said image with respect to the brightness of said field.

2. An optical device for producing nonlinear optical amplification comprising, in combination, means for receiving light rays from a field of view, means actuated by said receiving means to produce a visual image of said field in response to light rays incident from said field on said receiving means, and means cooperating with said receiving and image-producing means for amplifying the brightness of said image with relation to that of said field and for causing predetermined decrease of the ratio of brightness of the relatively more and less bright areas in said image with respect to the ratio of brightness of the corresponding areas in said field to provide reduced optical contrast but amplified general brightness in said image as compared with said field for clear visibility of each area in said image substantially free from glare, said device including a layer of material adapted in response to radiation incident thereon to emit electrons at a ratio of emitted to incident radiation for each unit area thereof which decreases progressively with increase in the rate of electron emission therefrom through at least a part of the emissivity range thereof to effect said reduced optical contrast in said visual image.

3. An optical device for producing nonlinear optical amplification comprising, in combination, means for receiving light rays from a field of view, means actuated by said receiving means to produce a visual image of said field in response to light rays incident from said field on said receiving means, means for amplifying the brightness of said image with respect to the brightness of said field, means cooperating with said amplifying means to cause predetermined increase in the ratio of brightness of the relatively more and less bright areas in said image with respect to the ratio of brightness of the corresponding areas in said field, said amplifying means including a layer of material adapted to emit electrons in response to radiation incident thereon, and said cooperating means including a layer of material positioned in the path of said electrons from said amplifying means and adapted in response to radiation incident thereon to emit electrons at a ratio of emitted to incident radiation for each unit area thereof which increases progressively with increase in the rate of electron emission therefrom through at least a part of the emissivity range thereof to effect said increased optical contrast in said visual image.

4. A viewing device of the character described for producing nonlinear optical amplification comprising, in combination, a mounting, a pair of means for receiving light rays from a field of view positioned in laterally spaced relation in said mounting, means actuated by each of said receiving means to produce a visual image of said field in response to light rays incident from said field on said receiving means, said image-reproducing means being positioned in laterally spaced relation in said mounting for binocular vision by a user of said device, means for amplifying the brightness of said image relative to the brightness of said field, and means for causing predetermined alteration of the optical contrast of said image with relation to said field.

5. A viewing device of the character described for producing nonlinear optical amplification comprising, in combination, an ophthalmic mounting, a pair of photoelectric means for receiving light rays from a field of view positioned in laterally spaced relation in said mounting, means actuated by each of said receiving means to produce a visual image of said field in response to light incident from said field on said receiving means, means for amplifying the brightness of said images relative to the brightness of said field, means for limiting amplification by said amplifying means and providing a maximum brightness per unit area of said images, and means positioning said image-reproducing means in said mounting and in laterally spaced relation for binocular vision by a user of said device.

6. An optical device of the character described for producing nonlinear optical amplification comprising, in combination, means for receiving light rays from a field of view, means actuated by said receiving means to reproduce an optical image of said field in response to light rays incident from said field on said receiving means, means for amplifying the brightness of said image relative to the brightness of said field, said device including a layer of electron emissive material, and means limiting the emission per unit area from said emissive layer to prevent the brightness of any portion of said image from exceeding a predetermined maximum.

7. An optical device of the character described for producing nonlinear optical amplification comprising, in combination, means for receiving light rays from a field of view, means actuated by said receiving means to reproduce an optical image of said field in response to light rays incident from said field on said receiving means, means for amplifying the brightness of said image relative to the brightness of said field, said device including a layer of electron emissive material, and means for providing selective electrical opposition to the flow of electrons from said emissive layer in accordance with the distribution of brightness in said field and to cause reduced optical contrast in said image.

8. An optical device of the character described for producing nonlinear optical amplification comprising, in combination, means for receiving light rays from a field of view, means actuated by said receiving means to reproduce an image of said field in response to light rays incident from said field on said receiving means, means for amplifying the brightness of said image relative to the brightness of said field, one of said receiving and amplifying means including a layer of electron emissive material comprising a multiplicity of discontinuous areas to limit the flow of electrons from each said area and to cause reduced optical contrast in said image relative to said field.

9. An optical device of the character described for producing nonlinear optical amplification comprising, in combination, means for receiving light rays from a field of view, means actuated by said receiving means to reproduce an image of said field in response to light rays incident from said field on said receiving means, means for amplifying the brightness of said image relative to the brightness of said field, one of said receiving and amplifying means including a layer of electron emissive material comprising a multiplicity of discontinuous areas to limit the flow of electrons from each said area and to cause reduced optical contrast in said image relative to said field, and means positioned between said emissive layer and said image-reproducing means and effective to develop a negative charge in response to electrons incident thereon to provide selective electrical opposition to the flow of said electrons to said image-reproducing means in accordance with the distribution of brightness in said field.

10. An optical device of the character described for producing nonlinear optical amplification comprising, in combination, means including a layer of photoelectric material for receiving light rays from a field of view, means actuated by said receiving means to reproduce an image of said field in response to light rays incident from said field on said receiving means, means for amplifying the brightness of said image relative to the brightness of said field and including a layer of electron emissive material positioned between said photoelectric layer and said image-reproducing means and adapted to provide secondary electrons in response to electrons incident thereon from said photoelectric layer, said device being constructed and arranged to provide an image of reduced optical contrast but increased brightness relative to said field.

11. An optical device of the character described for producing nonlinear optical amplification comprising, in combination, means for receiving light rays from a field of view, means actuated by said receiving means to reproduce an image of said field in response to light rays incident from said field on said receiving means, means for amplifying the brightness of said image relative to the brightness of said field and including a pair of layers of electron emissive material cooperating to emit secondary electrons in the direction of said image-reproducing means in response to light rays incident from said field on said receiving means, and means for maintaining the potential difference between said emissive layers such that the emission of electrons by the one of said pair of emissive layers nearer said image-reproducing means is in excess of the number of electrons incident on said layer from the other layer of said pair to produce on said first named layer selectively arranged net positive charges corresponding to brightly illuminated areas in said field, with resulting increased effective emission from said other layer and increased relative brightness in the corresponding areas of the final image.

12. An optical device of the character described for producing nonlinear optical amplification comprising, in combination, means including a layer of photoelectric material for receiving light rays from a field of view, means actuated by said receiving means to reproduce an image of said field in response to light rays incident from said field on said receiving means, means for amplifying the brightness of said image relative to the brightness of said field and including a layer of secondary electron emissive material positioned between said photoelectric layer and said image reproducing means and adapted to provide secondary electrons in response to electrons incident thereon from said photoelectric layer, one of said electron emissive layers comprising a multiplicity of discontinuous areas, each said area being adapted to become saturated when the light from the corresponding portion of said field exceeds a predetermined maximum brightness and thereby to prevent the brightness of the corresponding portion of said image from exceeding a predetermined maximum.

13. An optical device of the character described for producing nonlinear optical amplification comprising, in combination, means for receiving light rays from a field of view, means actuated by said receiving means to reproduce an image of said field in response to light rays incident from said field on said receiving means, means for amplifying the brightness of said image relative to the brightness of said field, said receiving and amplifying means including a thin layer of electron emissive material, the thickness of said layer being such that when the flow of electrons from a portion thereof exceeds a predetermined maximum, said portion will acquire a relatively positive charge and further electron emission therefrom will be limited accordingly to reduce the optical contrast of said image relative to said field.

14. An optical device of the character described for producing nonlinear optical amplification comprising, in combination, means for receiving light rays from a field of view, means actuated by said receiving means to reproduce an image of said field in response to light rays incident from said field on said receiving means, means for amplifying the brightness of said image relative to the brightness of said field, said receiving and amplifying means including a composite of a supporting layer of substantially transparent material having comparatively high electrical resistance, a layer of electron emissive material on one side of said resistance layer, and a layer of substantially transparent electric conducting material on the other side of said resistance layer, said resistance layer being of such thickness and resistance as to cause said electron emissive layer to acquire selectively distributed positive charges in accordance with the corresponding distribution of brightness in said field.

15. An optical device of the character described for producing nonlinear optical amplification comprising, in combination, means including a layer of photoelectric material for receiving light rays from a field of view, means actuated by said receiving means to reproduce an image of said field in response to light rays incident from said field on said receiving means, means for amplifying the brightness of said image relative to the brightness of said field and including a layer of secondary electron emissive material positioned between said photoelectric layer and said image-reproducing means and adapted to provide secondary electrons in response to electrons incident thereon from said photoelectric layer, said layer being positioned closely adjacent said image-reproducing means, and a layer adjacent said secondary emissive layer on the side away from said image-reproducing means comprising material having a potential in the quiescent state above that of said secondary emissive layer and said image-reproducing means and adapted to acquire a selective positive charge in response to electrons incident thereon from said secondary emissive layer to reduce the flow of said electrons to said image in accordance with the brightness of said field.

16. An optical device for producing nonlinear optical amplification comprising, in combination, means for receiving light rays from a field of view, amplifying means actuated by said receiving means in response to light rays incident on said receiving means from said field to form an electron image of said field of amplified brightness with respect to said field, means for converting said electron image into a visual image of amplified brightness with respect to said field, and said amplifying means including a layer of material adapted in response to electrons incident thereon to emit secondary electrons at a ratio of emitted to incident electrons for each unit area thereof varying with the rate of emission of electrons therefrom to effect predetermined alteration of the optical contrast of said visual image with respect to said field.

17. An optical device for producing nonlinear optical amplification comprising, in combination, means for receiving light rays from a field of view, means cooperating with said receiving means to form an electron image of said field of amplified brightness with respect to said field, means actuated by said electron image means to form a visual image of said field, each of said image-forming means including a layer of material adapted to emit electrons in response to radiation incident thereon, and means establishing a ratio of emitted to incident radiation for each unit area of at least one said layer which decreases progressively upon increase in the rate of emission of electrons therefrom to effect correspondingly progressive reduction in the optical contrast in said visual image with respect to said field.

18. An optical device for producing nonlinear optical amplification comprising, in combination, means for receiving light rays from a field of view, means for producing a visual image of said field in response to light rays incident from said field on said receiving means, and means for amplifying the brightness of said image with respect to the brightness of said field including a layer of material adapted in response to radiation incident thereon to emit secondary electrons at a ratio of emitted to incident electrons for each unit area thereof which varies depending upon the rate of electron emission therefrom to cause predetermined alteration of the optical contrast of said image with respect to the ratio of brightness of the relatively more and less bright areas in said image with respect to the ratio of brightness of the corresponding areas in said field.

19. An optical device for producing nonlinear optical amplification comprising, in combination, means for receiving light rays from a field of view, means actuated by said receiving means to produce a visual image of said field of amplified brightness with respect to said field in response to light rays incident from said field on said receiving means, said device including a layer of material adapted to emit electrons in response to radiation incident thereon, and means establishing a progressive decrease in the ratio of emitted to incident radiation for each unit area of said layer to provide correspondingly decreasing amplification of brightness in said image resulting in reduced optical contrast in said image wth respect to said field of view.

20. An optical device of the character described for producing nonlinear optical amplification comprising, in combination, photoelectric means for receiving light rays from a field of view, means actuated by said receiving means to reproduce an image of said field in response to light rays incident from said field on said receiving means, means for amplifying the brightness of said image with respect to the brightness of said field including a layer of material adapted to emit secondary electrons in response to electrons incident thereon at a ratio of emitted to incident electrons for each unit area thereof decreasing with increase in the rate of emission of electrons therefrom to cause progressive reduction in the degree of amplification of the brightness in the image formed thereby and corresponding reduction in the optical contrast in said visual image with respect to said field.

21. A viewing device of the character described for producing nonlinear optical amplification comprising a mounting, means in said mounting for receiving light rays from a field of view, means in said mounting actuated by said receiving means to produce a visual image of said field in response to light rays incident from said field on said receiving means, means positioned in said mounting between said receiving means and said image producing means for amplifying the brightness of said image with respect to the brightness of said field, means in said mounting cooperating with said amplifying means to cause predetermined alteration of the optical contrast of said image with relation to said field, and lens means in said mounting providing for direct viewing of said visual image.

CLINTON J. T. YOUNG.

References Cited in the file of this patent

UNITED STATES PATENTS

| Number | Name | Date |
|---|---|---|
| 2,058,941 | Arnhym | Oct. 27, 1936 |
| 2,143,095 | Thomas | Jan. 10, 1939 |
| 2,189,320 | Morton | Feb. 6, 1940 |
| 2,189,321 | Morton | Feb. 6, 1940 |
| 2,401,191 | Rosett | May 28, 1946 |